V. J. VAN HORN.
THREADED NUT.
APPLICATION FILED FEB. 12, 1919.
1,432,043.
Patented Oct. 17, 1922.
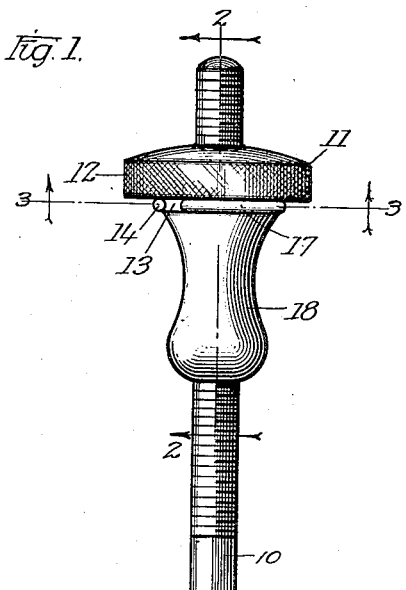
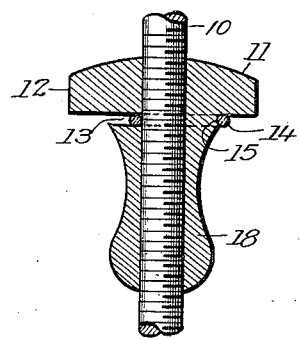
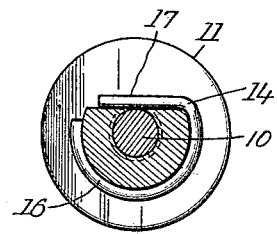
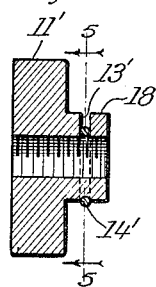
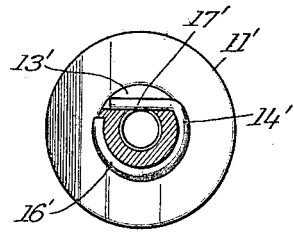
Witnesses:
Robert H. Weir
Arthur W. Carloss
Inventor
Vandiver J. Van Horn
Foree Bain & Bean
Attys.

Patented Oct. 17, 1922.

1,432,043

UNITED STATES PATENT OFFICE.

VANDIVER J. VAN HORN, OF CHICAGO, ILLINOIS.

THREADED NUT.

Application filed February 12, 1919. Serial No. 276,516.

*To all whom it may concern:*

Be it known that I, VANDIVER J. VAN HORN, a citizen of the United States, residing at Chicago, in the county of Cook and State of Illinois, have invented certain new and useful Improvements in Threaded Nuts, of which the following is a specification.

My invention relates to improvements in threaded nuts and has especial reference to check nuts, in which a definite frictional contact engagement of the nut is continuously maintained with the bolt.

One of the objects of my invention is to provide a threaded nut having an attachment that will exert a continuous yielding tension on the threads of a bolt to hold the nut in selected position thereon.

The device is not a nut lock, in the sense that the word is used in connection with means to securely fix a nut on a bolt, but is intended only for the purpose of exerting relatively less friction and only sufficient to maintain the nut in selected positions on the bolt to prevent its axial movement except when intentionally turned or rotated for that purpose.

There are many environments where a device of this character is to be desired, on compasses, calipers, tension and feed mechanisms, wherein the nut is to be turned from time to time by grasping it between the thumb and finger of the operator.

Other and further objects of my invention will become readily apparent, to persons skilled in the art, from a consideration of the following description when taken in conjunction with the drawings, wherein:—

Fig. 1 shows one form of nut, carrying the friction ring.

Fig. 2 is an axial section, taken on line 2—2 of Fig. 1.

Fig. 3 is a transverse section, taken on line 3—3 of Fig. 1.

Fig. 4 is a sectional view of another form of thumb nut carrying the friction ring.

Fig. 5 is a transverse section taken on line 5—5 of Fig. 4.

In all the views the same reference characters are employed to indicate similar parts.

10 is a threaded bolt or stem upon which the thumb nut 11 is adapted to be moved axially thereof by rotating it, by grasping the part 12 between the thumb and finger. This is a special nut for compasses, dividers, and the like.

After the thread has been cut in the nut, a slot 13 is cut preferably, in the smaller part of the nut, or the hub, within which to insert a spring wire ring 14. Registering with the slot 13 is an annular groove 15, in which the wire ring 14 rests to prevent its axial movement and displacement. The round part 16 of the ring is located within this groove and the flat part 17 is in contact with the threads of the stem or bolt 10 and exerts a frictional resistance to the rotation of the nut, in accordance with the tension exerted by the ring 14.

In Fig. 4 I have shown a slightly different form of nut 11' having a hub 18 within which is cut a slot 13' for a ring 14'. To insert the ring in its position on either form of nut the flat portion 17 is first put in the slot 13 and the round portion is snapped over the other side of the hub. The contact of the flat portion of the ring with the threads of the bolt or stem 10, produces sufficient friction to maintain the nut in selected position thereon and prevent it from coming loose or being moved axially, as a result of jar or other vibration. After either form of nut has been made the slot 13 is cut through the body part thereof by sawing tangentially of the inner surface of the nut until the slot extends into the bore of the nut. Then, when the wire is in place, the flat portion 17 will contact with the bolt within the nut and produce the desired resistance to rotation. It will be manifest that the larger portion of the nut could be provided with the slot 13 if desired, but it is more economical to place the slot in the portion of the nut of smaller diameter.

While I have herein shown a single embodiment of my invention for the purpose of clear disclosure, it is manifest that there may be changes made in the general arrangement and configuration of the parts within the scope of the appended claims.

Having described my invention, what I claim is:—

1. A nut having a threaded bore and a straight across slot extending into the bore and tangential thereto and a groove extending around the nut and connected at each end to the slot in combination with a spring ring having a straight, unconfined portion lying within the slot and a curved spring portion within the groove, the curved portion serving as a spring to press the straight portion into contact with a bolt upon which the nut may be placed.

2. A nut having a slot extending straight across into the bore of the nut and an annular groove registering with the ends of the slot; a spring ring having a round portion within the groove and a straight portion tangential to the bore, within the slot, the latter portion to lie between the threads of the bolt and extending from its curved portion toward the free end of its curved portion.

3. A nut having a threaded bore, a transversely extending slot cut from one side and intersecting the bore, and an annular groove registering with the ends of the slot, the slot forming flat surfaces on opposite sides of the bore; and a spring ring having a rounded portion received in the groove and a straight portion extending through the slot and intersecting the bore to engage the flat surfaces on opposite sides of the bore whereby its inward movement within the bore is limited, and the said straight portion, when the nut is placed upon a bolt, yieldingly engaging the threads of the bolt.

In testimony whereof I hereunto subscribed my name.

VANDIVER J. VAN HORN.